United States Patent
Glugla et al.

(10) Patent No.: US 9,605,603 B2
(45) Date of Patent: Mar. 28, 2017

(54) POSITION DETECTION FOR LOBE SWITCHING CAMSHAFT SYSTEM

(71) Applicant: Ford Global Technologies, LLC, Dearborn, MI (US)

(72) Inventors: Chris Paul Glugla, Macomb, MI (US); Jeffrey Allen Doering, Canton, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 582 days.

(21) Appl. No.: 14/105,000

(22) Filed: Dec. 12, 2013

(65) Prior Publication Data

US 2014/0303873 A1 Oct. 9, 2014

Related U.S. Application Data

(60) Provisional application No. 61/808,873, filed on Apr. 5, 2013.

(51) Int. Cl.
*F01L 13/00* (2006.01)
*F01L 1/34* (2006.01)
*F02D 19/10* (2006.01)

(52) U.S. Cl.
CPC .......... *F02D 19/10* (2013.01); *F01L 13/0036* (2013.01); *F01L 13/0042* (2013.01); *F01L 2013/0052* (2013.01); *F01L 2013/0078* (2013.01); *Y02T 10/36* (2013.01)

(58) Field of Classification Search
CPC . F01L 13/0063; F01L 13/0036; F01L 13/053; F01L 13/0015; F01L 2013/0068; F01L 2013/0073; F01L 2013/0052; F01L 2013/0078; F01L 2013/0084; F01L 2013/111; F01L 2013/113; F02D 2041/001; F02D 2041/227; F02D 41/3005; F02D 41/221; F02D 13/0203; F02D 13/0257; F02D 13/0047; F02D 13/0042
USPC .............................. 123/90.16, 90.18
See application file for complete search history.

(56) References Cited

U.S. PATENT DOCUMENTS

| | | | | |
|---|---|---|---|---|
| 2,969,051 | A * | 1/1961 | Webster | F01L 13/0042 123/90.18 |
| 3,523,465 | A * | 8/1970 | Harrell | F01L 1/047 123/90.18 |
| 3,689,140 | A * | 9/1972 | Harvey | G03B 23/18 353/103 |
| 3,730,150 | A * | 5/1973 | Codner, Jr. | F01L 13/0042 123/90.18 |
| 6,415,753 | B1 * | 7/2002 | Nagaosa | F01L 1/34 123/90.15 |
| 6,745,736 | B2 * | 6/2004 | Walters | F01L 1/34 123/90.15 |

(Continued)

FOREIGN PATENT DOCUMENTS

GB 2492102 A * 12/2012 ......... F02D 13/0226

*Primary Examiner* — Thomas Moulis
*Assistant Examiner* — George Jin
(74) *Attorney, Agent, or Firm* — Julia Voutyras; McCoy Russell LLP

(57) ABSTRACT

Systems and methods for determining an active cam profile from a plurality of cam profiles is disclosed. The systems and methods may be used to determine how to operate an engine torque actuator or provide an indication of cam profile switching degradation.

20 Claims, 6 Drawing Sheets

(56) References Cited

U.S. PATENT DOCUMENTS

| | | | |
|---|---|---|---|
| 7,404,383 B2* | 7/2008 | Elendt | F01L 13/0036 123/90.16 |
| 9,038,583 B2* | 5/2015 | Stolk | F01L 13/0036 123/90.16 |
| 2003/0079701 A1* | 5/2003 | Riedle | F01L 1/34 123/90.15 |
| 2007/0039579 A1* | 2/2007 | Fuwa | F02D 13/023 123/90.16 |
| 2009/0272351 A1* | 11/2009 | Ezaki | F01L 9/04 123/90.17 |
| 2010/0242873 A1* | 9/2010 | Meintschel | F01L 1/047 123/90.1 |
| 2010/0251982 A1* | 10/2010 | Elendt | F01L 1/047 123/90.18 |
| 2012/0125273 A1* | 5/2012 | Werler | F01L 13/0036 123/90.6 |
| 2012/0125274 A1* | 5/2012 | Werler | F01L 13/0036 123/90.15 |
| 2012/0138001 A1* | 6/2012 | Werler | F01L 13/0036 123/90.18 |
| 2012/0260870 A1* | 10/2012 | Wahl | F01L 1/053 123/90.6 |

* cited by examiner

POSITION DETECTION FOR LOBE SWITCHING CAMSHAFT SYSTEM

CROSS REFERENCE TO RELATED APPLICATION

This application claims priority to U.S. Provisional Patent Application No. 61/808,873, filed Apr. 5, 2013, the entire contents of which are hereby incorporated herein by reference for all purposes.

BACKGROUND AND SUMMARY

Engines may use cam switching systems to adjust valve lift and valve opening duration of cylinder poppet valves. By adjusting valve lift and valve opening duration, it may be possible to tailor valve operation for engine operating conditions so that engine performance and efficiency may be improved. For example, reduced valve lift and shorter valve opening time durations may be applied at lower engine speeds and loads. On the other hand, higher valve lift and longer valve opening durations may be applied at higher engine speeds and loads. Additionally, cam switching systems may be used to deactivate selected engine cylinders during low driver demand conditions to increase efficiency of operating engine cylinders.

U.S. Pat. No. 7,404,383 describes an example cam switching system where an engine includes a camshaft with multiple outer sleeves that include lobes and the sleeves are splined to a central camshaft. By engaging a pin into a grooved hub in each sleeve, the axial position of the sleeve can be adjusted so that a different cam lobe engages a roller finger follower (RFF) that operates a poppet valve. However, it may be possible to command the pin into the groove without the pin actually entering the groove and without the cam profile switching. For example, if the pin does not extend when a solenoid is supplied electrical current, the cam profile may not switch from a first profile to a second profile. Consequently, if the engine control system adjusts the fuel amount in response to the expected activated cam profile, engine torque and air-fuel ratio may degrade.

The inventors herein have recognized potential issues with operating a cam profile switching mechanism and have developed a method for determining engine state, comprising: commanding a cam sleeve to move axially; providing a signal indicative of a presence or an absence of the cam sleeve moving axially, the signal provided responsive to rotation of a feature of the cam sleeve; and adjusting an engine actuator responsive to the signal.

By determining axial movement of a cam sleeve via rotation of a feature of the cam sleeve, it may be possible to determine which of a plurality of cam profiles is presently active. For example, a rotation sensing cam profile sensor may be located at a fixed position where it may detect rotation of one or more cam sleeve features that are indicative of cam sleeve axial position. A first rotating feature of the cam sleeve may indicate that a first cam profile is presently active while a second rotating feature of the cam sleeve may indicate when a second cam profile is active. In this way, an activated cam profile may be determined so that an engine torque actuators may be adjusted in a desirable manner.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
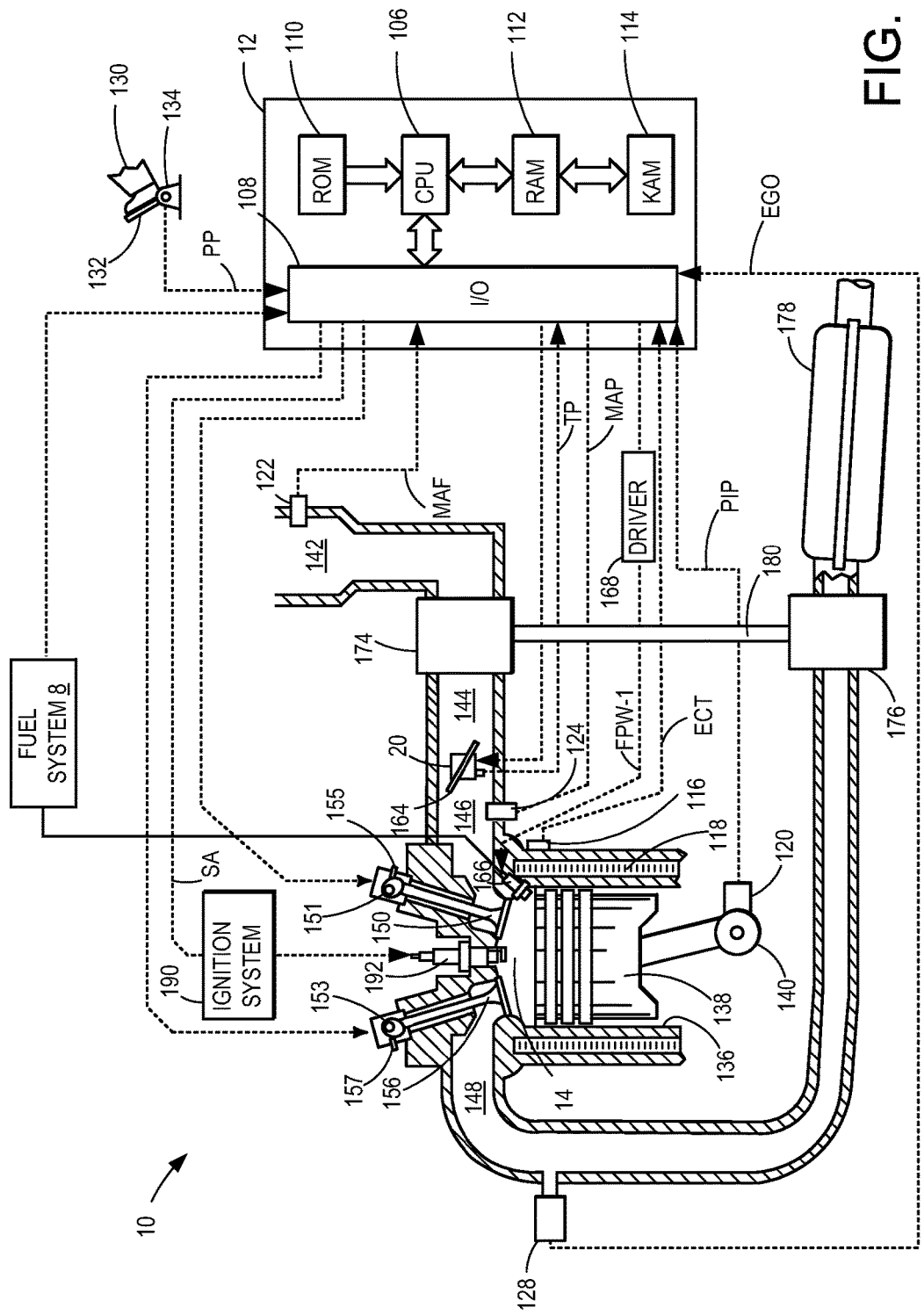
FIG. 1 shows a schematic diagram of one cylinder of an example engine system.
Figure 2:
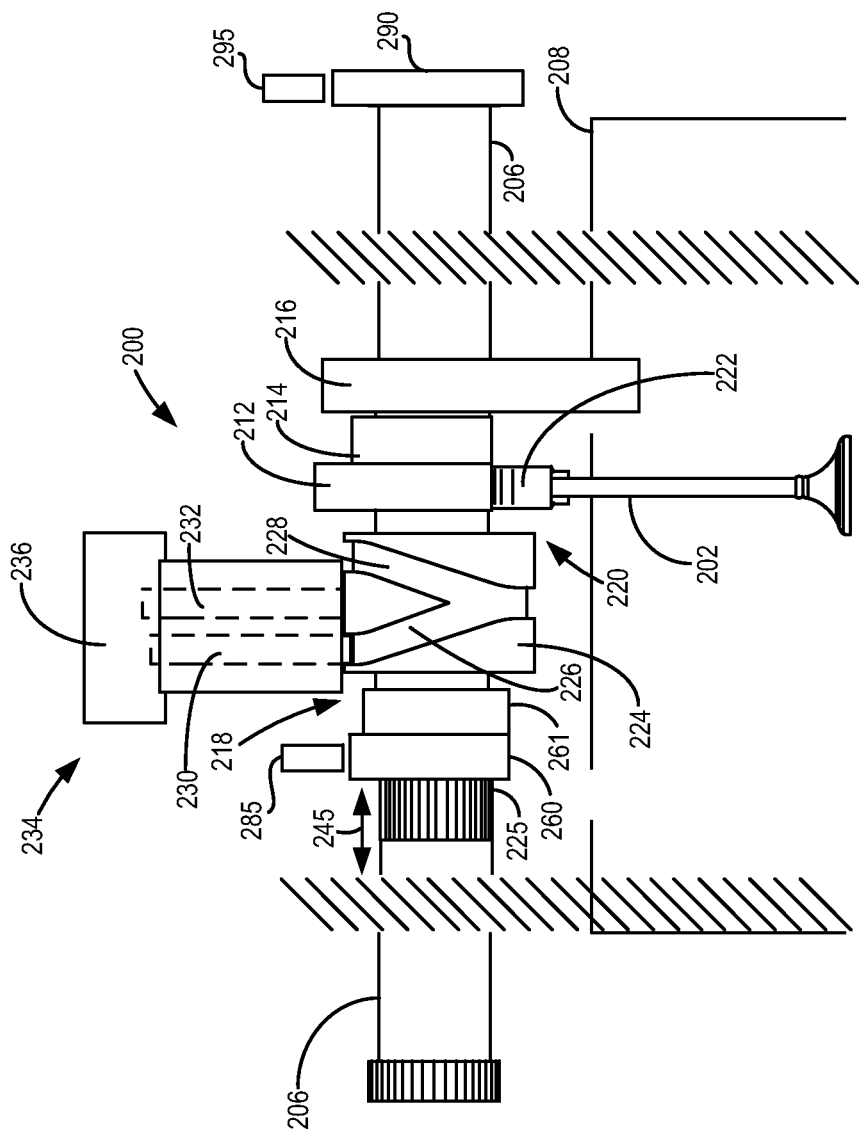
FIGS. 2 and 3 show two different operating positions for an example cam lobe switching system.
Figure 3:
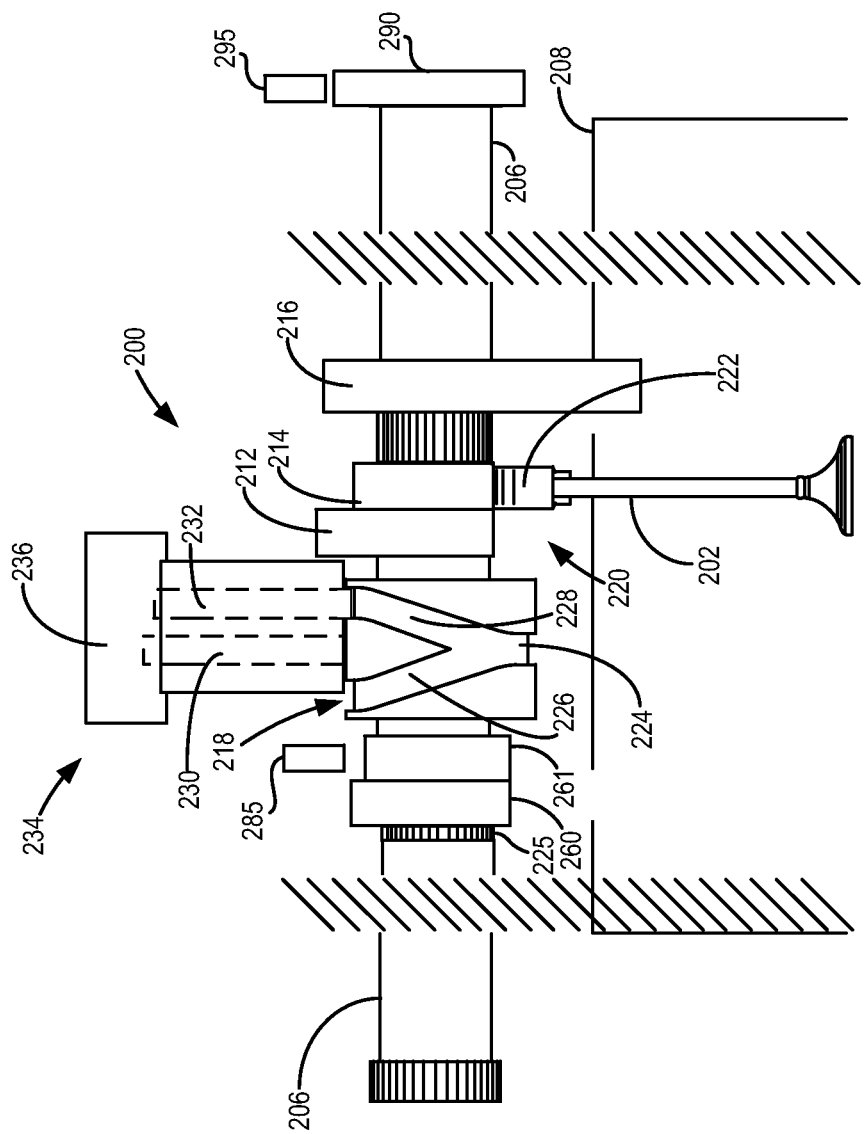
Figure 4:
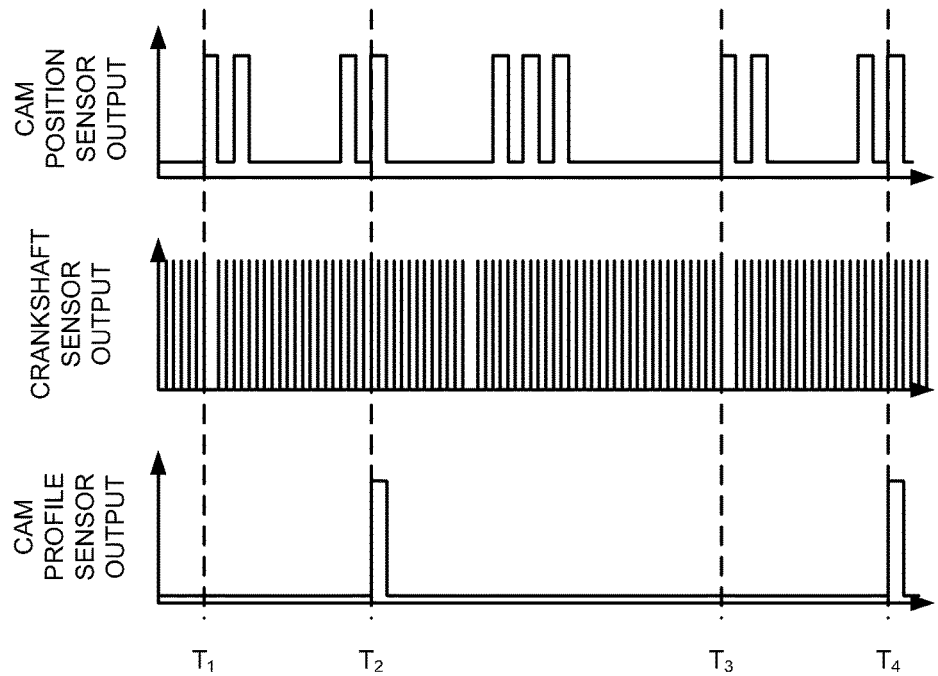
FIGS. 4 and 5 show example cam profile sensor output relative to a cam position sensor output and crankshaft position sensor output.
Figure 5:
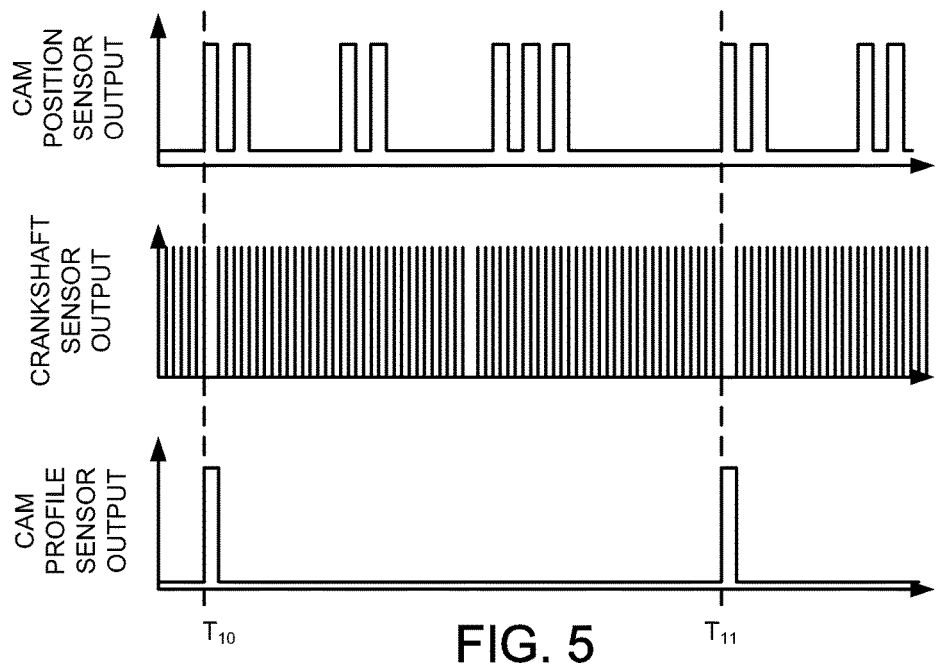
Figure 6:
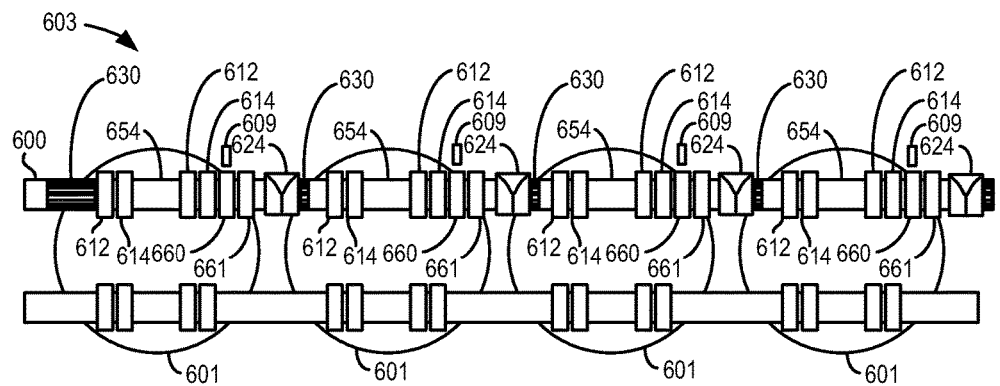
FIGS. 6 and 7 show example cam sleeve positions relative to engine cylinders.

The following description relates to systems and methods for a cam switching system in an engine used to adjust valve lift of gas exchange valves in cylinders of the engine, such as the engine shown in FIG. 1. As shown in FIGS. 2 and 3, an engine may include a camshaft with multiple outer sleeves containing lobes splined to a central camshaft. By engaging a pin into a grooved hub in each sleeve, the axial position of the sleeve can be repositioned so that a different cam lobe engages a follower of a poppet valve of a cylinder, a slider finger follower, or a shaft-mounted follower. Activated cam profiles may be determined from sensor outputs as shown in FIGS. 4 and 5. FIGS. 5 and 6 show a plan view of a plurality of cam sleeves incorporated into a camshaft, the cam sleeves including different cam profiles for changing engine operation. A method for activating and confirming activation of various cam profiles is described in FIG. 7.

Turning now to the figures, FIG. 1 depicts an example of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake passages 142, 144, and 146. The intake passages may be intake air passages. Intake passage 146 may communicate with other cylinders of engine 10 in addition to cylinder 14. In some examples, one or more of the intake passages may include a boosting device such as a turbocharger or a supercharger. For example, FIG. 1 shows engine 10 including a turbocharger with a compressor 174 arranged between intake passages 142 and 144, and an exhaust turbine 176 arranged along exhaust passage 148. Compressor 174 may be at least partially powered by exhaust turbine 176 via a shaft 180 where the boosting device is a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178 although in some examples, exhaust gas sensor 128 may be positioned downstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake valve 150 (e.g., intake poppet valve) and at least one exhaust valve 156 (e.g., exhaust poppet valve) located at an upper region of cylinder 14. In some examples, each cylinder of engine 10, including cylinder 14, may include at least two intake valves (e.g., intake poppet valves) and at least two exhaust valves (e.g., exhaust poppet valve) located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively.

Cylinder 14 can have a compression ratio, which is the ratio of volumes when piston 138 is at bottom center to top center. Conventionally, the compression ratio is in the range of 9:1 to 12:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some examples, spark plug 192 may be omitted, such as where engine 10 may initiate combustion by auto-ignition or by injection of fuel as may be the case with some diesel engines.

In some examples, each cylinder of engine 10 may include one or more fuel injectors for delivering fuel. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that, in an alternate example, injector 166 may be a port injector providing fuel into the intake port upstream of cylinder 14. Further, while the example shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof. It should be understood that the head packaging configurations and methods described herein may be used in engines with any suitable fuel delivery mechanisms or systems, e.g., in carbureted engines or other engines with other fuel delivery systems.

Controller 12 includes read only memory 110, a central processing unit 106, random access memory 112, keep alive memory 114, and inputs and outputs 108. Controller 12 may store executable instructions for the methods described herein in non-transitory memory. Controller 12 also receives input from the various sensors previously mentioned as well as crankshaft position sensor 120 and engine temperature sensor 116. Temperature sensor 116 is shown coupled to coolant jacket 116. Controller 12 also receives input from intake manifold pressure sensor 124 and intake air temperature sensor 122.

During operation, each cylinder within engine 10 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 14 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 138 back to BDC. Crankshaft 140 converts piston movement into a rotational torque of the rotary shaft. Finally, during the exhaust stroke, the exhaust valve 156 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine. As such each cylinder may similarly include its own set of intake/exhaust valves, fuel injector(s), spark plug, etc.

FIG. 2 shows an example cam lobe switching system 200 for application in cam actuator systems 151 and 153 of engine 10 shown in FIG. 1. Cam lobe switching system 200 adjusts a lift and/or valve opening duration of a gas exchange valve 202 in response to engine operating conditions. Camshaft 206 is shown positioned above a cylinder head 208 of an engine cylinder bank. Valve 202 may be an intake valve or an exhaust valve, configured to open and close an intake port or exhaust port in a cylinder, such as cylinder 14 shown in FIG. 1. For example, valve 202 may be actuatable between an open position allowing gas exchange into or out of a cylinder and a closed position substantially blocking gas exchange into or out of the cylinder. It should be understood that though only one valve is shown in FIG. 2; however, engine 10 shown in FIG. 1 may include any number of cylinder valves. For example, engine 10 of FIG. 1 may include any number of cylinders with associated valves and a variety of different cylinder and valve configurations may be used, e.g., V-6, I-4, I-6, V-12, opposed 4, and other engine types.

One or more cam towers or camshaft mounting regions may be coupled to cylinder head 208 to support camshaft 206. For example, cam tower 216 is shown coupled to cylinder head 208 adjacent to valve 202. Though FIG. 2 shows a cam tower coupled to the cylinder head, in other examples, the cam towers may be coupled to other components of an engine, e.g., to a camshaft carrier or the cam cover. The cam towers may support overhead camshafts and may separate the lift mechanisms positioned on the camshafts above each cylinder.

Valve 202 may operate in a plurality of lift and duration modes, e.g., a high valve lift, low or partial valve lift, short opening duration, long opening duration, and zero valve lift. For example, as described in more detail below, by adjusting cylinder cam mechanisms, the valves on one or more cylinders, e.g., valve 202, may be operated in different lift modes based on engine operating conditions.

Camshaft 206, which may be an intake camshaft or an exhaust camshaft, may include a plurality of cams configured to control the opening and closing of the intake valves. For example, FIG. 2 shows a first cam lobe 212 and a second cam lobe 214 positioned above valve 202. The cams lobes may have different shapes and sizes to form lift profiles used to adjust an amount and timing of a lifting of valve 202 while camshaft 206 rotates. For example, cam 212 may be a full lift cam lobe and cam 214 may be a partial lift or low lift cam lobe. Though, FIG. 2 shows two lift profiles associated with first cam 212 and second cam 214, it should be understood that any number of lift profile cams may be present, e.g., three different cam lobes. For example, camshaft 206 may additionally include a zero lift cam used to deactivate valve 202 during certain engine operating conditions.

Valve 202 includes a mechanism 218 coupled to the camshaft above the valve for adjusting an amount of valve lift for that valve and/or for deactivating that valve by changing a location of cam lobes along the camshaft relative to valve 202. For example, the cam lobes 212 and 214 may be slideably attached to the camshaft so that they can slide along the camshaft in an axial direction on a per-cylinder basis. For example, a plurality of cam lobes, e.g., cam lobes 212 and 214, positioned above each cylinder valve, e.g., valve 202, may be slid across the camshaft in directions indicated by arrow 245 to change a cam lobe profile coupled to the valve follower, e.g., follower 220 coupled to valve 202, to change the valve opening and closing durations and lift amounts. The valve cam follower 220 may include a roller finger follower (RFF) 222 which engages with a cam lobe positioned above valve 202. For example, in FIG. 2, RFF 222 is shown engaging with full lift cam lobe 212.

Additional follower elements not shown in FIG. 2 may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders may each have only one exhaust valve and/or intake valve, or more than one intake and/or exhaust valves. In still other examples, exhaust valves and intake valves may be actuated by a common camshaft. However, in an alternate example, at least one of the intake valves and/or exhaust valves may be actuated by its own independent camshaft or other device.

An outer sleeve 224 may be coupled to the cam lobes 212 and 214 splined to camshaft 206. Outer sleeve 224 may also include a first cam profile indicator 260 and a second cam profile indicator 261. Each of the first and second cam profile indicator may have protrusions (e.g., teeth or a lobe) or depressions to indicate the active cam profile. The number of cam profile indicators may equal the number of cam profiles. The first cam profile indicator 260 rotates with outer sleeve 224 and camshaft 206. Likewise, the second cam profile indicator 261 rotates with outer sleeve 224 and camshaft 206. First cam profile indicator 260 has a different profile or shape with respect to crankshaft position and/or camshaft position than second cam profile 261. Rotation sensing camshaft profile sensor 285 outputs a signal that is indicative of the position of first cam profile indicator 260 or second cam profile indicator 261 depending on the position of sleeve 224. When sleeve 224 is in a first position activating a first cam lobe 212, rotation sensing camshaft profile sensor 285 outputs a signal indicative of a position of first cam profile indicator 260 as camshaft 206 rotates. Camshaft position relative to the engine crankshaft is determined via rotation sensing camshaft position sensor 295 and camshaft position indicator 290.

The camshaft may be coupled with a cam phaser that is used to vary the valve timing with respect to crankshaft position. By engaging a pin, e.g., one of the pins 230 or 232, into a grooved hub in the outer sleeve, the axial position of the sleeve can be repositioned to that a different cam lobe engages the cam follower coupled to valve 202 in order to change the lift of the valve. For example, sleeve 224 may include one or more displacing grooves, e.g., grooves 226 and 228, which extend around an outer circumference of the sleeve. The displacing grooves may have a helical configuration around the outer sleeve and, in some examples, may form a Y-shaped or V-shaped groove in the outer sleeve, where the Y-shaped or V-shaped groove is configured to engage two different actuator pins, e.g., first pin 230 and second pin 232, at different times in order to move the outer sleeve to change a lift profile for valve 202. Sleeve 224 is shown in a first position while FIG. 3 shows sleeve 224 in a second position. Sleeve 224 follows spline 225 in an axial direction when profiles are being switched. Further, a depth of each groove in sleeve 224 may decrease along a length of the groove so that after a pin is deployed into the groove from a home position, the pin is returned to the home position by the decreasing depth of the groove as the sleeve and camshaft rotate.

For example, as shown in FIG. 2, when first pin 230 is deployed into groove 226, outer sleeve 224 will shift in a direction toward cam tower 216 while camshaft 206 rotates thus positioning cam lobe 212 above valve 202 and changing the lift profile. In order to switch back to cam lobe 214, second pin 232 may be deployed into groove 228 which will shift outer sleeve 224 away from cam tower 216 to position cam lobe 214 above valve 202. In some examples, multiple outer sleeves containing lobes may be splined to camshaft 206. For example, outer sleeves may be coupled to cam lobes above every valve in engine 10 or a select number of lobes above the valves.

Actuator pins 230 and 232 are included in a cam lobe switching actuator 234 which adjusts the positions of the pins 230 and 232 in order to switch cam lobes positioned above a valve 202. Cam lobe switching actuator 234 includes an activating mechanism 236, which may be hydraulically powered, or electrically actuated, or combinations thereof. Activating mechanism 236 changes positions of the pins in order to change lift profiles of a valve. For example, activating mechanism 236 may be a coil coupled to both pins 230 and 232 so that when the coil is energized, e.g., via a current supplied thereto from the control system, a force is applied to both pins to deploy both pins toward the sleeve.

FIG. 3 shows the same cam lobe switching system 200 as is shown in FIG. 2. The components of cam lobe switching system 200 are identified with the same reference numbers. However, FIG. 3 shows cam sleeve 224 in a second position as determined by deploying pin 232. When sleeve 224 is in the second position activating a second cam lobe 212 as shown, rotation sensing camshaft profile sensor 285 outputs a signal indicative of a position of second cam profile indicator 261 as camshaft 206 rotates. Thus, by adjusting the axial position of sleeve 224, rotation sensing camshaft profile sensor 285 is exposed to different profiles of different rotating cam profile indicators 260 and 261. Camshaft profile sensor 285 outputs different signals depending on whether it is exposed to the rotation of first cam profile indicator 260 or second cam profile indicator 261.

Thus, the system of FIGS. 1-3 provides for a cam profile detection system, comprising: an engine torque actuator; a camshaft including an axially movable sleeve; a first pin and a second pin selectively activated via an actuator; a rotation sensing camshaft position sensor; a rotation sensing camshaft profile sensor; and a controller including executable instructions stored in non-transitory memory for adjusting the engine torque actuator responsive to a position of the axially movable sleeve as determined from the rotation sensing camshaft profile sensor. The cam profile detection system further comprises additional instructions for comparing output from the rotation sensing camshaft profile sensor to output from the rotation sensing camshaft position sensor. The cam profile detection system further comprises a crankshaft sensor and additional instructions for comparing output from the rotation sensing camshaft profile sensor to output from the crankshaft position sensor. In some examples, the cam profile detection system includes where the engine torque actuator is a fuel injector. The cam profile detection system includes where the axially movable sleeve includes a grove for receiving the first and second pins.

Referring now to FIG. 4, an example of a cam profile sensor output relative to a cam position sensor output and a crankshaft position sensor output is shown. The cam profile, cam position, and crankshaft position sensor outputs may be for a system as shown in FIGS. 1-3. It should also be mentioned that additional or fewer pulses for each of the sensors shown may be provided without departing from the scope of this disclosure. Further, the pulse widths shown are merely for illustration purposes and not intended to limit the scope of this disclosure.

The first plot from the top of FIG. 4 is example output of a cam position sensor as an engine rotates through a cycle (e.g., 720 crankshaft degrees) that repeats. The cam position sensor outputs two pulses beginning at zero crankshaft degrees, followed by two more pulses, followed by three more pulses before repeating during a second engine cycle.

The second plot from the top of FIG. 4 is example output of a crankshaft position sensor as the engine rotates. The crankshaft position sensor output repeats every engine rotation (e.g., 360 crankshaft degrees). At zero crankshaft degrees a tooth is missing on the crankshaft indicator wheel which produces an absence of a pulse.

The third plot from the top of FIG. 4 is an example output of a cam profile sensor output sensing rotation of a first cam profile indicator (e.g., 260 of FIGS. 2 and 3) when a cam sleeve is in a first position (e.g., FIG. 2 sleeve 224) where a first cam lobe (e.g., 212 of FIG. 2) is activated.

At time $T_1$, the engine is at zero degrees and the cam position sensor outputs a first pulse in response to a camshaft tooth. The crankshaft position sensor stays low in response to absence of a tooth on a crankshaft position wheel. The cam profile sensor output remains low.

Between time $T_1$ and time $T_2$, the cam position sensor outputs two additional pulses that are spaced apart in crankshaft degrees. Additionally, the crankshaft position sensor outputs a pulse for each tooth of a crankshaft position indicator wheel.

At time $T_2$, before the engine rotates a full revolution, the cam profile sensor begins to output a pulse in response to a tooth of a first cam profile indicator. The cam profile indicator rotates with the camshaft and may be coupled to cam lobes. The cam position sensor also begins to output a fourth pulse since time $T_1$. The crankshaft also outputs a pulse. It may be observed that the pulse from the cam profile sensor occurs at the same time as unique pulses from the cam position sensor and the crankshaft sensor. For example, the cam profile sensor begins to output a pulse at the same time a fourth pulse is output from the cam position sensor (e.g., the second pulse of a group of two pulses). Similarly, the cam profile sensor begins to output the pulse at the time the $21^{st}$ pulse since the missing tooth is output from the crankshaft position sensor. Thus, based on the timing of the cam profile sensor pulse relative to the crankshaft position sensor pulses or the cam position sensor pulses, it may be determined that the first cam lobe profile is active.

Between time $T_2$ and time $T_3$, the crankshaft position sensor outputs a signal including a missing pulse which is indicative of a missing tooth of a crankshaft position indicator wheel. The missing tooth indicates that the crankshaft has rotated 360 crankshaft degrees.

At time $T_3$, the sequence repeats again as the engine begins to rotate through a second cycle. The outputs of the cam profile sensor, the cam position sensor, and the crankshaft position sensor also repeat with the same timings between the signals.

At time $T_4$, a second pulse is output from the cam profile position sensor. The timing of the second pulse from the cam profile sensor is at the same engine position relative to the outputs of the cam position sensor and the crankshaft position sensor during the first engine cycle. Thus, it may be determined from the cam profile sensors and the cam position sensor that the first cam lobe profile is active. Further, during conditions where camshaft phase is adjusted relative to crankshaft position, the phase change can be accounted for so that the cam profile is appropriately determined.

Referring now to FIG. 5, an example of the cam profile sensor output relative to cam position sensor output, which is indicative of cam position, and crankshaft sensor output, which is indicative of crankshaft position, is shown. The plots and signals of FIG. 5 are similar to those of FIG. 4. Therefore, for the sake of brevity, only differences between the plots are described. Where the plots of FIGS. 4 and 5 are the same, the description of FIG. 4 applies to FIG. 5.

At time $T_{10}$, the cam position sensor begins to output a first pulse and the crankshaft position sensor does not output a pulse in response to an absence of a missing tooth of a crankshaft position indicator wheel. The output from the cam position sensor and the crankshaft position sensor indicate that the engine is at zero crankshaft degrees. In this example, the cam profile sensor also begins to output a pulse at time $T_{10}$ or zero crankshaft degrees. The cam profile position sensor outputs a pulse at zero crankshaft degrees when the cam sleeve is in a position where the second cam lobe is activated. Thus, the timing of the cam profile output pulse is unique from the timing shown in FIG. 4 so that it may be determined that the second cam profile is active. In one example, the cam profile sensor output may be compared to the cam sensor output or the crankshaft sensor output to determine when the first or second cam profile is activated. Since the cam profile sensor outputs a pulse at a different crankshaft location and camshaft location when the first cam profile or lobe is active as compared to the time the cam profile sensor outputs a pulse when the second cam profile or lobe is active, it may be determined which of the first or second cam profiles are active. Likewise, if additional cam profiles are available, pulses are output from the cam profile sensor at unique engine positions as determined from the cam position sensor or crankshaft position sensor such that each cam profile may be uniquely identified so that engine operation may be modified as desired.

Between time $T_{10}$ and time $T_{11}$, the engine rotates through a completed cycle (e.g., two revolutions) and the cam position sensor outputs a pulse train indicative of camshaft position and engine position. The crankshaft position sensor also outputs a pulse train with a missing tooth that indicates a single revolution of the engine.

At time $T_{11}$, a second cam profile pulse begins to be output at the same engine position as the first pulse from the cam profile sensor which occurred at time $T_{10}$. Thus, the engine continues to operate with the cam sleeve positioned such that the second cam profile or lobe is activated. The cam profile sensor outputs the cam pulse with the timing shown when it is exposed to rotation of the second profile indicator (e.g., 261 of FIG. 2).

Thus, from the signals of FIGS. 4 and 5, an active cam profile may be determined from rotation of a cam sleeve and its features relative to crankshaft and/or camshaft sensor outputs which are indicative of camshaft and crankshaft positions. In this way, output from a sensor that detects rotation of a cam sleeve may be used to determine which of a plurality of cam profiles or lobes is active at a particular time.

Referring now to FIG. 6 example cam sleeve positions relative to engine cylinders for an active first cam profile is shown. In particular, FIG. 6 shows a plan view of camshaft 600 and cylinder bank 603 including cylinders 601. In this example, camshaft 600 operates two intake valves via two sets of cam lobes. Cam sleeves 654 include first cam lobes 612 and second cam lobes 614. Cam sleeves 654 also include first cam profile indicator 660 and second cam profile indicator 661. In this example, each cylinder 60 includes first and second cam lobes 612 and 614 as well as first and second cam profile indicators 660 and 661. However, in other examples, a single cam sleeve 654 may provide each cylinder with a plurality of different cam profiles. The position of cam sleeves 654 is adjusted via pin guides 624 which rotate with sleeves 654. In particular, stationary pins (e.g., 230 and 232 of FIG. 2) cause cam sleeves 654 to slide axially along camshaft 600 as camshaft 600 rotates. In this example, a pin is deployed (not shown) so that the cam sleeves 654 are in a first position where first cam lobes 612 operate cylinder poppet valves while second cam lobes 614 do not operate cylinder poppet valves. Further, when cam sleeves 654 are in the first position, rotation sensing cam profile sensor 609 is positioned to sense rotation of first cam profile indicator 660. The first cam profile may be determined by observing the length of exposed splines 630 while the first cam profile is active.

Figure 7:
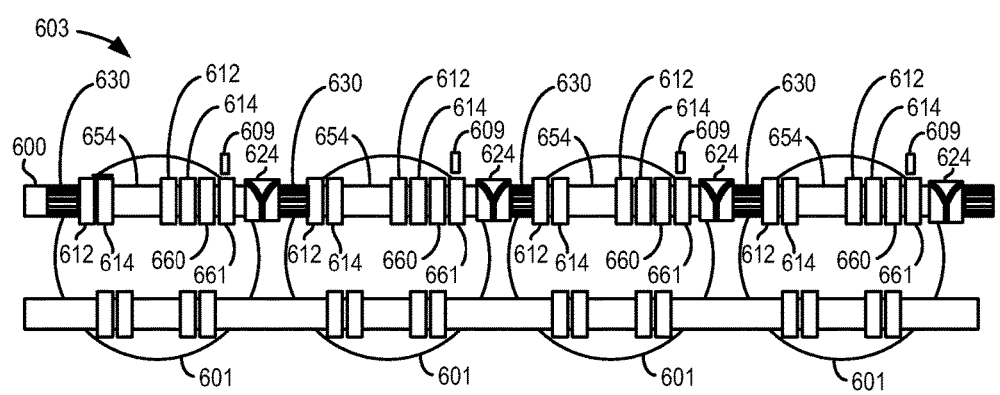

FIG. 7 shows the same camshaft as is shown in FIG. 6 in a second position different from the position shown in FIG. 6. The engine and camshaft elements shown in FIG. 7 are the same as those shown in FIG. 6. Therefore, for the sake of brevity, the description of elements is not repeated. FIG. 7 shows camshaft 600 in a second position that is shifted left from the position shown in FIG. 6. In particular, cam sleeves 654 are shifted left so that first cam lobes 612 and second cam lobes 614 are also shifted left. By shifting sleeves 654 to the left, second cam lobes 614 operate cylinder poppet valves while first cam lobes 612 rotate without activating cylinder poppet valves. Further, when cam sleeves 654 are in the second position, rotation sensing cam profile sensor 609 is positioned to sense rotation of second cam profile indicator 661. Additionally, the amount of exposed splines 630 is also noticeably different between FIG. 6 and FIG. 7. Thus, cam sleeves 654 slide in an axial direction across camshaft 600 in order to operate cylinder poppet valves with different cam lobes during different engine operating conditions.

It should be noted that for some examples, the camshaft and sleeves may be arranged so that one end sleeve may be shifted left while the other end sleeve may be shifted right to balance axial loading and camshaft thrust (e.g., forces exhibited by check ball detents on the base camshaft to hold sleeve in place).

Figure 8:
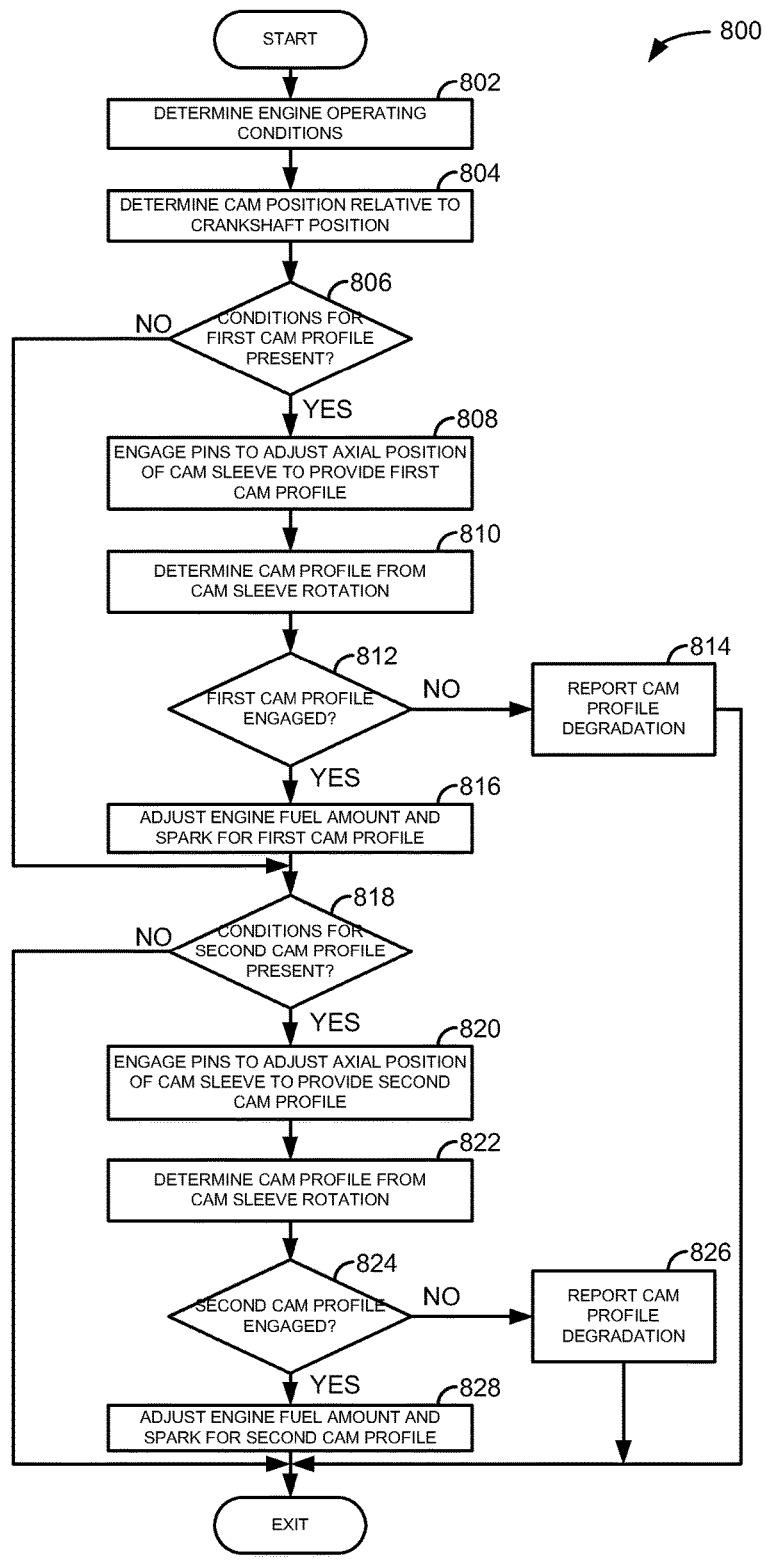
FIG. 8 shows an example method for operating and determining which of a plurality of cam profiles is active.

Referring now to FIG. 8, a method for operating and determining which of a plurality of cam profiles is active. The method of FIG. 8 may be stored as executable instructions in non-transitory memory of the system shown in FIGS. 1-3 and 6-7. The method of FIG. 8 may provide the operating sequence shown in FIGS. 4 and 5.

At 802, method 800 determines engine operating conditions. Engine operating conditions may include but are not limited to engine speed, engine load, driver demand torque, engine temperature, active transmission gear, and vehicle speed. Method 800 proceeds to 804 after engine operating conditions are determined.

At 804, method 800 determines camshaft position relative to crankshaft position. In one example, method 800 compares placement of pulses from a crankshaft sensor to pulses of a camshaft sensor as described with reference to FIGS. 4 and 5. The relative placement of camshaft pulses with respect to crankshaft pulses indicates the position of the camshaft to the crankshaft. In this way, phase changes between the camshaft and crankshaft may be determined. Method 800 proceeds to 806 after camshaft position relative to crankshaft position is determined.

At 806, method 800 judges whether or not conditions are present for operating the camshaft with a first cam profile. The first cam profile may operate one or more cylinder poppet valves of one or more cylinders with a specific valve opening duration and valve lift amount (e.g., short opening duration with a low lift amount). In one example, the cam profiles are activated and deactivated in response to engine speed and engine torque. For example, a first cam profile may be activated at lower engine speeds and loads while a second cam profile is activated at higher engine speeds and higher engine loads. Further, in some examples, the cam profile is selected to deactivate selected cylinder. If method 800 judges that operating conditions are present for operating the engine with a first cam profile, the answer is yes and method 800 proceeds to 808. Otherwise, the answer is no and method 800 proceeds to 818.

At 808, method 800 engages a pin to cause a cam sleeve to move in an axial direction along a length of a camshaft and relative to a bank of cylinders. As the cam sleeves rotate with the camshaft, the stationary pin urges the cam sleeve to move axially. Method 800 proceeds to 810 after the pin or pins are engaged.

At 810, method 800 compares the output of a rotation sensing camshaft profile sensor to output of a rotation sensing camshaft position sensor or crankshaft position sensor. The rotation sensing camshaft profile sensor outputs pulses at different crankshaft positions and/or camshaft positions depending on which cam profile is active. If a cam profile pulse occurs at a camshaft or crankshaft position indicative of an active first cam profile, method 800 determines that the first cam profile is active. If method 800 determines that a cam profile pulse is absent or at a position other than that which is expected for an activated first cam profile, method 800 determines that the first cam profile is not active. Method 800 also adjusts the expected positions of cam profile pulses for any phase difference between camshaft and crankshaft positions determined at 804. Method 800 proceeds to 812 after the cam profile is determined.

At 812, method 800 judges whether or not the first cam profile is engaged. If method 800 receives a pulse output from the cam profile sensor at an expected camshaft or crankshaft position, the answer is yes and method 800 proceeds to 816. Otherwise, if the pulse is absent or at an unexpected location relative to camshaft and/or crankshaft position, the answer is no and method 800 proceeds to 814.

At 814, method 800 reports and logs a conditions of cam profile degradation and operates engine torque actuators (e.g., throttle, fuel injectors, spark timing, cam phasers) according to the presently active cam profile as indicated by a pulse output from the rotation sensing camshaft profile sensor. Method 800 may send a message to a driver or illuminate a light to notify the drive+ degradation is reported and logged.

At 816, method 800 adjusts and engine torque actuator based on positive confirmation of the first cam profile being active. In one example, the torque actuator is a fuel injector and the fuel amount is adjusted in response to positive confirmation that the first cam profile is active. Additionally, other torque actuators such as the engine throttle, cam phase, and spark timing may be adjusted. Method 800 proceeds to 818 after the engine torque actuator is adjusted.

At 818, method 800 judges whether or not conditions are present for operating the camshaft with a second cam profile that is different than the first cam profile. The second cam profile may operate one or more cylinder poppet valves of one or more cylinders with a specific valve opening duration and valve lift amount (e.g., long opening duration with a high lift amount). In one example, the cam profiles are activated and deactivated in response to engine speed and engine torque. If method 800 judges that operating conditions are present for operating the engine with a second cam profile, the answer is yes and method 800 proceeds to 820. Otherwise, the answer is no and method 800 proceeds to exit.

At 820, method 800 engages a pin to cause a cam sleeve to move in an axial direction along a length of a camshaft and relative to a bank of cylinders. As the cam sleeves rotate with the camshaft, the stationary pin urges the cam sleeve to move axially. Method 800 proceeds to 822 after the pin or pins are engaged.

At 822, method 800 compares the output of a rotation sensing camshaft profile sensor to output of a rotation sensing camshaft position sensor or crankshaft position sensor. The rotation sensing camshaft profile sensor outputs pulsed at different crankshaft positions and/or camshaft positions depending on which cam profile is active. If a cam profile pulse occurs at a camshaft or crankshaft position indicative of an active second cam profile, method 800 determines that the second cam profile is active. If method 800 determines that a cam profile pulse is absent or at a position other than that which is expected for an activated second cam profile, method 800 determines that the second cam profile is not active. Method 800 proceeds to 824 after the cam profile is determined.

At 824, method 800 judges whether or not the second cam profile is engaged. If method 800 receives a pulse output from the cam profile sensor at an expected camshaft or crankshaft position, the answer is yes and method 800 proceeds to 828. Otherwise, if the pulse is absent or at an unexpected location relative to camshaft and/or crankshaft position, the answer is no and method 800 proceeds to 826.

At 826, method 800 reports and logs a conditions of cam profile degradation and operates engine torque actuators (e.g., throttle, fuel injectors, spark timing, cam phasers) according to the presently active cam profile as indicated by a pulse output from the rotation sensing camshaft profile sensor. Method 800 may send a message to a driver or illuminate a light to notify the driver. Method 800 proceeds to exit after degradation is reported and logged.

At 828, method 800 adjusts and engine torque actuator based on positive confirmation of the second cam profile being active. In one example, the torque actuator is a fuel injector and the fuel amount is adjusted in response to positive confirmation that the second cam profile is active. Additionally, other torque actuators such as the engine throttle, cam phase, and spark timing may be adjusted. Method 800 proceeds to exit after the engine torque actuator is adjusted.

It should also be noted that method 800 may be extended to include more than two cam profiles. For example, method 800 may accommodate three or four cam profiles via adding steps similar to 806 to 816 for each additional cam profile. In this way, method 800 may judge whether or not selective cam profiles are activated in response to output from a sensor that detects cam sleeve rotation.

Thus, the method of FIG. 8 provides for determining engine state, comprising: commanding a cam sleeve to move axially; providing a signal indicative of a presence or an absence of the cam sleeve moving axially, the signal provided responsive to rotation of a feature of the cam sleeve; and adjusting an engine actuator responsive to the signal. The method includes where the feature is a recess or protrusion. The method also includes where the feature does not operate to open or close a poppet valve of a cylinder. The method includes where the cam sleeve is moved axially via a pin and a groove, the groove included with the sleeve. The method includes where the engine actuator is a fuel injector, and further comprising changing the signal depending on which of a plurality of cam lobe profiles is operating a poppet valve of a cylinder. The method includes where the signal is changed via changing timing of a pulse with respect to camshaft position or crankshaft position.

The method of FIG. 8 also provides for determining engine state, comprising: commanding a cam sleeve to move axially; and adjusting an engine actuator in response to axial movement of a cam sleeve indicated via rotation of the cam sleeve. In this way, axial movement of a cam sleeve to activate a cam profile may be detected so that positive confirmation of engine operating state is determined.

In some examples, the method further comprises sensing rotation of the cam sleeve. The method further comprises sensing rotation of the cam sleeve. The method includes where the actuator is a fuel injector. The method further comprises commanding the cam sleeve to move axially in response to a change of engine load or speed. The method includes where the cam sleeve is move axially via a pin following a groove in the sleeve. The method further comprises comparing a signal from a first rotating feature of the cam sleeve to a camshaft position signal or a crankshaft position signal. The method further comprises comparing a signal from a second rotating feature of the cam sleeve to the camshaft position signal or the crankshaft position signal.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for determining engine state, comprising:
commanding a cam sleeve to move axially;
providing a signal indicative of a presence or an absence of the cam sleeve moving axially, the signal provided responsive to comparing rotation of a feature of the cam sleeve to a camshaft position; and
adjusting an engine actuator responsive to the signal.

2. The method of claim 1, where the feature is a recess or protrusion.

3. The method of claim 1, where the feature does not operate to open or close a poppet valve of a cylinder.

4. The method of claim 1, where the cam sleeve is moved axially via a pin and a groove, the groove included with the cam sleeve.

5. The method of claim 1, where the engine actuator is a fuel injector, and further comprising changing the signal depending on which of a plurality of cam lobe profiles is operating a poppet valve of a cylinder.

6. The method of claim 5, where the signal is changed via changing timing of a pulse indicative of the rotation of the feature of the cam sleeve with respect to the camshaft position or a crankshaft position.

7. A method for determining engine state, comprising:
commanding a cam sleeve to move axially;
comparing a camshaft profile sensor output to a camshaft position sensor output to determine a presence or an absence of the cam sleeve moving axially; and
adjusting an engine actuator in response to determining the presence of axial movement of the cam sleeve.

8. The method of claim 7, where the camshaft position sensor output is provided via a rotation sensing camshaft position sensor.

9. The method of claim 7, where the cam sleeve moves relative to a splined camshaft.

10. The method of claim 7, where the cam sleeve operates a cylinder poppet valve.

11. The method of claim 7, where the actuator is a fuel injector.

12. The method of claim 7, further comprising commanding the cam sleeve to move axially in response to a change of engine load or speed.

13. The method of claim 7, where the cam sleeve moves axially via a pin following a groove in the cam sleeve.

14. The method of claim 7, further comprising comparing the camshaft profile sensor output to a crankshaft position signal.

15. The method of claim 7, where the engine actuator is a cam phase.

16. A cam profile detection system, comprising:
   an engine torque actuator;
   a camshaft including an axially movable sleeve;
   a first pin and a second pin selectively activated via an actuator;
   a rotation sensing camshaft position sensor;
   a rotation sensing camshaft profile sensor; and
   a controller including executable instructions stored in non-transitory memory for:
      comparing output from the rotation sensing camshaft profile sensor to output from the rotation sensing camshaft position sensor, and
      adjusting the engine torque actuator responsive to a position of the axially movable sleeve as determined from the comparison of the rotation sensing camshaft profile sensor and the rotation sensing camshaft position sensor.

17. The cam profile detection system of claim 16, where the engine torque actuator is a cam phase.

18. The cam profile detection system of claim 16, further comprising a crankshaft sensor and additional instructions for comparing output from the rotation sensing camshaft profile sensor to output from the crankshaft sensor.

19. The cam profile detection system of claim 16, where the engine torque actuator is a fuel injector.

20. The cam profile detection system of claim 16, where the axially movable sleeve includes a groove for receiving the first and second pins.

\* \* \* \* \*